US008818003B2

(12) United States Patent
Lee et al.

(10) Patent No.: US 8,818,003 B2
(45) Date of Patent: Aug. 26, 2014

(54) MOBILE TERMINAL AND CONTROL METHOD THEREOF

(75) Inventors: Keansub Lee, Gyeonggi-Do (KR); Hosung Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/543,063

(22) Filed: Jul. 6, 2012

(65) Prior Publication Data
US 2013/0279719 A1 Oct. 24, 2013

(30) Foreign Application Priority Data

Apr. 23, 2012 (KR) ........................ 10-2012-0042270

(51) Int. Cl.
*H03G 3/00* (2006.01)
(52) U.S. Cl.
USPC .......................................... 381/107; 381/105
(58) Field of Classification Search
CPC .... H04M 1/6008; H04M 1/605; H04M 1/236
USPC ........... 381/74, 104, 109; 178/18.03; 345/173
See application file for complete search history.

(56) References Cited

U.S. PATENT DOCUMENTS

| 2002/0174336 | A1* | 11/2002 | Sakakibara et al. | 713/172 |
|---|---|---|---|---|
| 2008/0102902 | A1* | 5/2008 | Epley | 455/567 |
| 2008/0130910 | A1* | 6/2008 | Jobling et al. | 381/74 |
| 2009/0245533 | A1* | 10/2009 | Gerlach | 381/86 |
| 2009/0245537 | A1* | 10/2009 | Morin | 381/107 |
| 2010/0035648 | A1* | 2/2010 | Huang | 455/556.1 |
| 2011/0080490 | A1* | 4/2011 | Clarkson et al. | 348/222.1 |
| 2012/0112995 | A1* | 5/2012 | Maeda | 345/156 |
| 2012/0231849 | A1* | 9/2012 | Yamashita | 455/566 |

FOREIGN PATENT DOCUMENTS

| JP | 10-112743 | 4/1998 |
|---|---|---|
| JP | 10-336284 | 12/1998 |
| KR | 10-2009-0032582 | 4/2009 |

* cited by examiner

*Primary Examiner* — Fan Tsang
*Assistant Examiner* — Eugene Zhao
(74) *Attorney, Agent, or Firm* — Lee, Hong, Degerman, Kang & Waimey

(57) ABSTRACT

Disclosed are a mobile terminal and a control method thereof. The mobile terminal includes: a sound output module configured to output a sound; a user input unit configured to sense a control command for controlling a volume level of the output sound; and a controller configured to control a volume level of the output sound based on the sensed control command, configured to determine whether the controlled volume level corresponds to a preset volume level, and if the controlled volume level corresponds to the preset volume level, configured to output a signal corresponding to the preset volume level in the form of a signal different from the output sound.

5 Claims, 21 Drawing Sheets

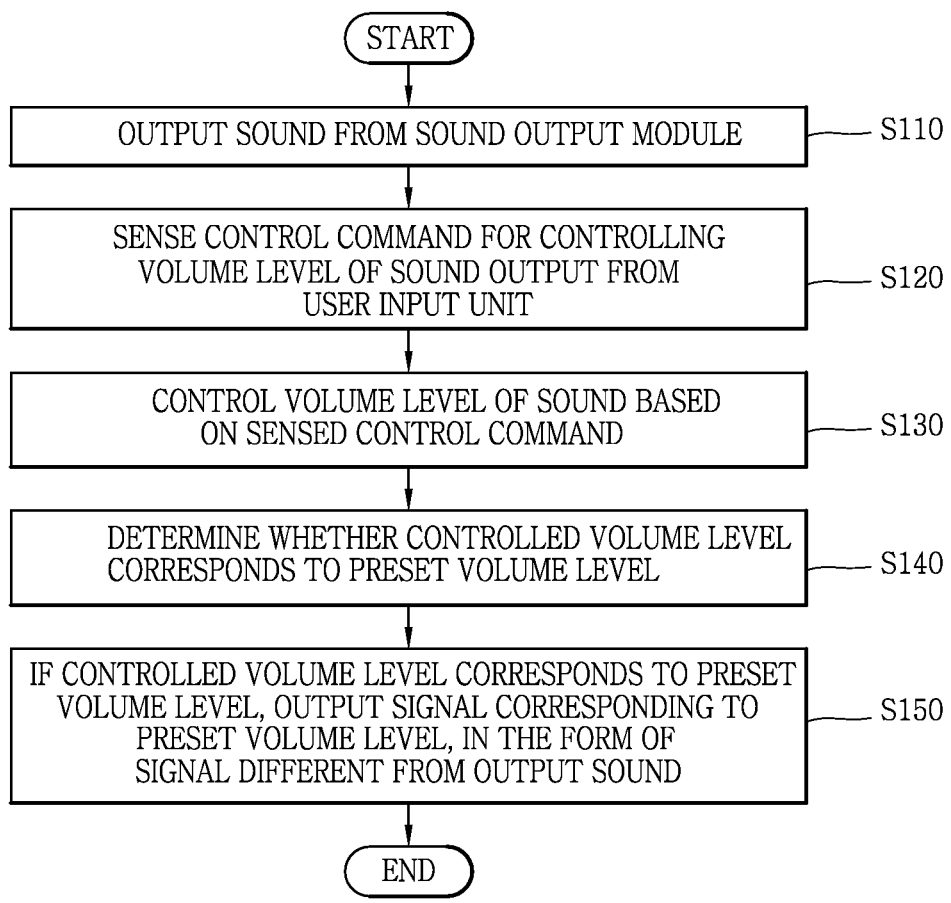

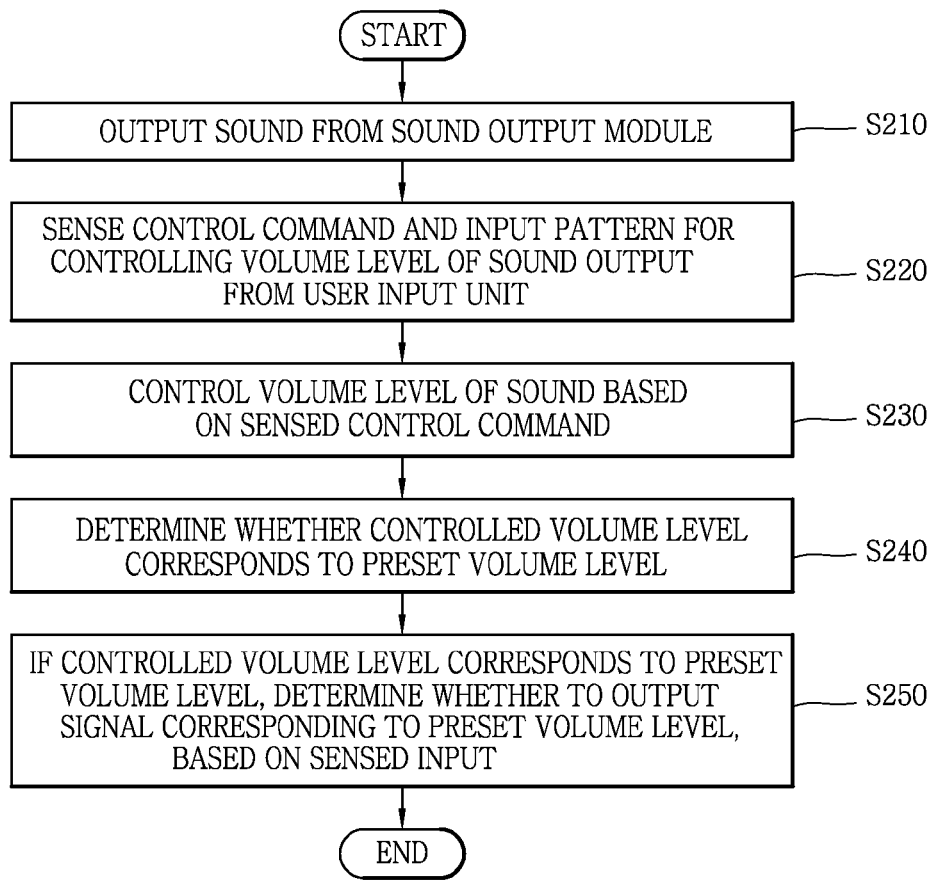

MOBILE TERMINAL AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2012-0042270, filed on Apr. 23, 2012, the contents of which is incorporated by reference herein in its entirety.

BACKGROUND OF THE INVENTION

1. Field of the Invention

The present disclosure relates to a mobile terminal, and particularly, to a mobile terminal having a sound output module, and a control method thereof.

2. Background of the Invention

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software.

A sound output module for outputting a sound may be mounted to the mobile terminal. A user can control a volume level of a sound outputted from a user input unit provided at the mobile terminal. Generally, information on a controlled volume level may be displayed on a display unit of the mobile terminal. However, in a case where the user cannot view the display unit due to a call or other reasons, the user cannot easily check whether the controlled volume level is a preset volume level or not.

SUMMARY OF THE INVENTION

Therefore, an aspect of the detailed description is to provide a mobile terminal capable of enhancing a user's convenience in informing whether a controlled volume level is a preset volume level, and a control method thereof.

To achieve these and other advantages and in accordance with the purpose of this specification, as embodied and broadly described herein, there is provided a mobile terminal, comprising: a sound output module configured to output a sound; a user input unit configured to sense a control command for controlling a volume level of the output sound; and a controller configured to control a volume level of the output sound based on the sensed control command, configured to determine whether the controlled volume level corresponds to a preset volume level, and if the controlled volume level corresponds to the preset volume level, configured to output a signal corresponding to the preset volume level in the form of a signal different from the output sound.

In this embodiment, the preset volume level may include a maximum volume level and a minimum volume level, among a plurality of reference volume levels controllable according to a control command applied to the user input unit.

In this embodiment, if the controlled volume level corresponds to the preset volume level, the controller may output, for a preset time, at least one of an effective sound signal and a vibration signal corresponding to the preset volume level.

In this embodiment, if the controlled volume level corresponds to the preset volume level, the controller may provide a bounce effect to the output sound.

In this embodiment, if the controlled volume level corresponds to the maximum volume level, the controller may provide a bounce effect to the output sound. And, the bounce effect may be provided to the output sound, within the range between the maximum volume level and a volume level lower than the maximum volume level by one level.

In this embodiment, if the controlled volume level corresponds to the minimum volume level, the controller may provide a bounce effect to the output sound. And, the bounce effect may be provided to the output sound, within the range between the minimum volume level and a mute level.

In this embodiment, the controller may sense an input pattern applied to the user input unit so as to control the volume level. If the controlled volume level corresponds to the preset volume level, the controller may determine whether to output a signal corresponding to the preset volume level, based on the sensed input pattern.

In this embodiment, the controller may sense the input pattern based on an input time applied to the user input unit.

In this embodiment, if the controlled volume level corresponds to the preset volume level, the controller may ignore a control command applied to the user input unit.

In this embodiment, the user input unit may include at least one of a side up key for increasing a volume level, and a side down key for decreasing a volume level. If the controlled volume level corresponds to the maximum volume level, the controller may lock the side up key. On the contrary, if the controlled volume level corresponds to the mute level, the controller may lock the side down key.

In this embodiment, the mobile terminal may further comprise: a terminal body; and a sensing unit configured to sense a distance between the terminal body and a user, wherein the controller is configured to control a volume level of the output sound based on the sensed distance.

In this embodiment, the sensing unit may be configured to sense a distance between the terminal body and the user, using at least one of a proximity sensor, an infrared ray sensor, an ultrasonic sensor and a heat sensor, or based on a user's contact area with a display unit.

To achieve these and other advantages and in accordance with the purpose of this specification, as embodied and broadly described herein, there is also provided a method for controlling a mobile terminal, the method comprising: outputting a sound from a sound output module; sensing a control command for controlling a volume level of the sound output from the user input unit; controlling a volume level of the output sound based on the sensed control command; determining whether the controlled volume level corresponds to a preset volume level; if the controlled volume level corresponds to the preset volume level, outputting a signal corresponding to the preset volume level in the form of a signal different from the output sound.

In this embodiment, the preset volume level may include a maximum volume level and a minimum volume level, among a plurality of reference volume levels controllable according to a control command applied to the user input unit.

In this embodiment, the step of outputting a signal corresponding to the preset volume level in the form of a signal different from the output sound may include outputting at least one of an effective sound signal and a vibration signal corresponding to the preset volume level for a preset time, if the controlled volume level corresponds to the preset volume level.

In this embodiment, the step of outputting a signal corresponding to the preset volume level in the form of a signal different from the output sound may include providing a bounce effect to the output sound, if the controlled volume level corresponds to the preset volume level.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 3 is a flowchart showing an embodiment of a mobile terminal according to the present invention;

FIG. 10 is a flowchart showing another embodiment of a mobile terminal according to the present invention;

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
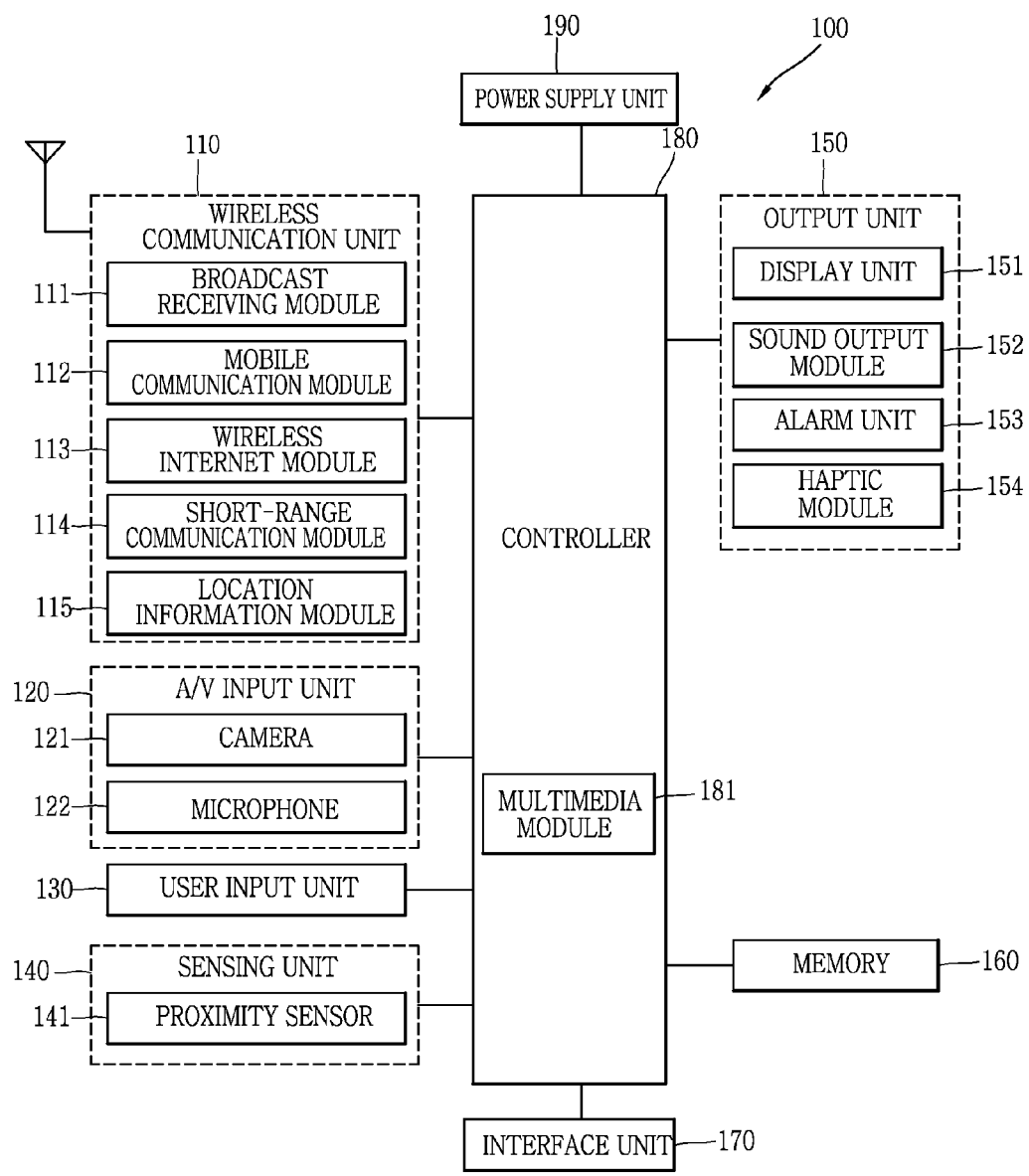
FIG. 1 is a block diagram showing a mobile terminal according to the present invention.

FIG. 1 is a block diagram of a mobile terminal 100 according to one embodiment of the present disclosure.

Referring to FIG. 1, the mobile terminal 100 may comprise components, such as a wireless communication unit 110, an Audio/Video (A/V) input unit 120, a user input unit 130, a sensing unit 140, an output unit 150, a memory 160, an interface unit 170, a controller 180 and a power supply unit 190. FIG. 1 shows the mobile terminal 100 having various components, but it is understood that implementing all of the illustrated components is not a requirement. Greater or fewer components may alternatively be implemented.

Hereinafter, each component 110~190 of the mobile terminal 100 will be explained in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114 and a position information module 115.

The broadcast receiving module 111 receives broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network. In this case, the broadcast associated information may be received by the mobile communication module 112. The broadcast signals and the broadcast associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image data of still pictures or video acquired by an image capture device in a video capturing mode or an image capturing mode. The processed image frames may be displayed on a display unit 151. The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that senses changes in resistance, pressure, capacitance, etc. due to being contacted) a jog wheel, a jog switch, and the like.

The sensing unit 140 senses a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can sense whether or not the power supply unit 190 supplies power or whether or not the interface unit 170 is coupled with an external device.

The sensing unit 140 may include a proximity sensor 141. And, the touch sensor 140 may include a touch sensor (not shown) for sensing a touch operation with respect to the display unit 151.

The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

If the display unit 151 and the touch sensor have a layered structure therebetween, the display unit 151 may be used as an input device rather than an output device. The display unit 151 may be referred to as a 'touch screen'.

When touch inputs to the touch screen are sensed, corresponding signals are transmitted to a touch controller (not shown). The touch controller processes the received signals, and then transmits corresponding data to the controller 180. Accordingly, the controller 180 may sense which region of the display unit 151 has been touched.

When the touch screen is implemented as a capacitance type, proximity of a pointer to the touch screen is sensed by changes of an electromagnetic field. In this case, the touch screen (touch sensor) may be categorized into a proximity sensor.

The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 is configured to provide outputs in a visual, audible, and/or tactile manner. The output unit 150 may include the display unit 151, an sound output module 152, an alarm unit 153 and a haptic module 154.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

At least one of the displays of the display unit 151 may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of displays may be arranged on one surface integrally or separately, or may be arranged on different surfaces.

The sound output module 152 may convert and output as sound audio data received from the wireless communication unit 110 or stored in the memory 160 in a call signal reception mode, a call mode, a record mode, a voice recognition mode, a broadcast reception mode, and the like. Also, the sound output module 152 may provide audible outputs related to a particular function performed by the mobile terminal 100 (e.g., a call signal reception sound, a message reception sound, etc.). The sound output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the sound output module 152. Accordingly, the display unit 151 or the sound output module 152 may be classified as part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Hereinafter, will be explained a method for processing a user's input to the mobile terminal 100.

The user input unit 130 is manipulated to receive a command for controlling the operation of the mobile terminal 100, and may include a plurality of manipulation units. The manipulation units may be referred to as manipulating portions, and may include any type of ones that can be manipulated in a user's tactile manner.

Various types of visible information may be displayed on the display unit 151. Such information may be displayed in several forms, such as characters, numbers, symbols, graphics and icons. Alternatively, such information may be implemented as 3D stereoscopic images. For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another. For example, an output window and an input window may be displayed at upper and lower portions of the display unit 151, respectively. The output window and the input window are configured to output and input information, respectively. Soft keys representing numbers for inputting telephone numbers or the like may be output on the input window. Once a soft key is touched, a number or the like corresponding to the touched soft key is displayed to the output window. Upon manipulating the manipulation unit, a call connection for a telephone number displayed on the output window is attempted, or a text output on the output window may be input to an application.

The display unit 151 or the touch pad may be configured to sense a touch scroll. A user may scroll the display unit 151 or the touch pad to move a cursor or a pointer positioned on an object displayed on the display unit 151 (e.g., an icon). In addition, in case of moving a finger on the display unit 151 or the touch pad, the path of the finger being moved may be visibly displayed on the display unit 151, which can be useful upon editing an image displayed on the display unit 151.

One function of the mobile terminal 100 may be executed in correspondence with a case where the display unit 151 and the touch pad are touched together within a preset time. An example of being touched together may include clamping a terminal body with the user's thumb and index fingers. The one function, for example, may be activating or deactivating the display unit 151 or the touch pad.

Figure 2A:
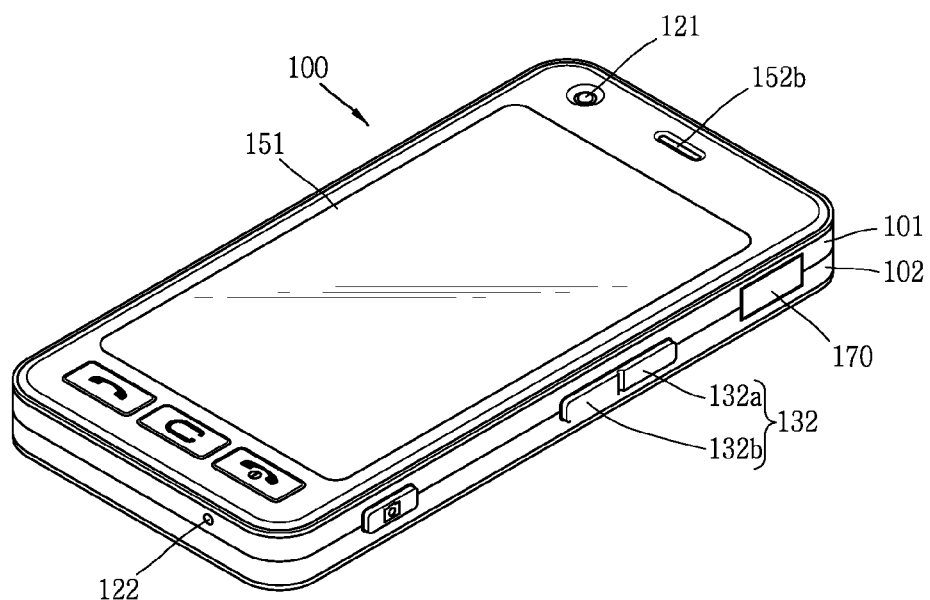
FIGS. 2A and 2B are perspective views showing the appearance of a mobile terminal according to the present invention.
Figure 2B:
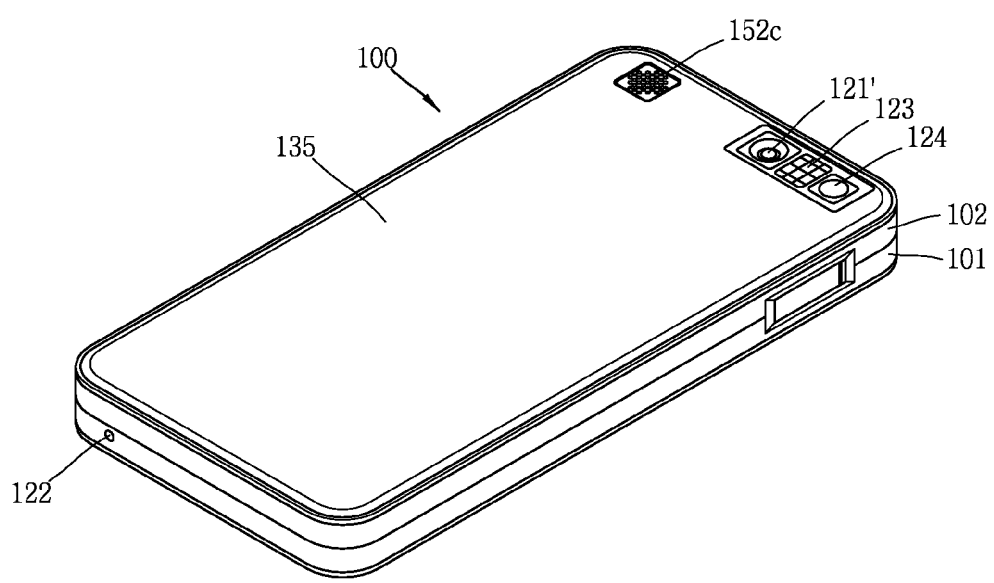

FIG. 2A is a view showing a front surface and one side surface of the mobile terminal 100, which illustrates the appearance of the mobile terminal 100 in accordance with the present disclosure. And, FIG. 2B is a view showing a rear surface and another side surface of the mobile terminal 100.

As shown in FIG. 2A, the mobile terminal 100 is a bar type mobile terminal. However, the present disclosure is not limited to this, but may be applied to a slide type in which two or more bodies are coupled to each other so as to perform a relative motion, a folder type, or a swing type, a swivel type and the like.

A case (casing, housing, cover, etc.) forming the appearance of a terminal body may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, a sound output module 152, a camera 121, a user input unit 130 (refer to FIG. 1), a microphone 122, an interface unit 170, etc.

The display unit 151 occupies most parts of a main surface of the front case 101. The sound output module 152 and the camera 121 are arranged at a region adjacent to one end of the display unit 151, and the user input unit 131 and the microphone 122 are arranged at a region adjacent to another end of the display unit 151. The user input unit 132, the interface unit 170, etc. may be arranged on side surfaces of the front case 101 and the rear case 102.

The user input unit 130 is manipulated to receive a command for controlling the operation of the mobile terminal 100, and may include a plurality of manipulation units 131 and 132.

The manipulation units 131 and 132 may receive various commands. For instance, the first manipulation 131 is configured to input commands such as START, END, SCROLL or the like, and the second manipulation unit 132 is configured to input commands for controlling a level of sound outputted from the sound output module 152, or commands for converting the current mode of the display unit 151 to a touch recognition mode.

Referring to FIG. 2B, a camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution), whereas the camera 121' may operate with a relatively higher pixels (higher resolution). Thus, the camera 121 may be useful when a user can capture his face and send it to another party during a video call or the like. This can reduce a size of transmission data. On the other hand, the camera 121' may be used to store images of a high picture quality.

The cameras 121 and 121' may be installed at the terminal body so as to rotate or pop-up.

A flash 123 and a mirror 124 (not shown) may be additionally disposed close to the camera 121'. The flash 123 operates in conjunction with the camera 121' when taking a picture using the camera 121'. The mirror 124 can cooperate with the camera 121' to allow a user to photograph himself in a self-portrait mode.

A sound output module 152' may be additionally arranged on a rear surface of the terminal body. The sound output module 152' may cooperate with the sound output module 152 (refer to FIG. 2A) so as to implement a stereo function. Also, the sound output module 152' may be configured to operate as a speakerphone during a call.

A broadcast signal receiving antenna 116 as well as an antenna for calling may be additionally disposed on a side surface of the terminal body. The broadcast signal receiving antenna 116 of the broadcast receiving module 111 (refer to FIG. 1) may be configured to retract into the terminal body.

A power supply unit 190 for supplying power to the mobile terminal 100 is mounted to the terminal body. The power supply unit 190 may be mounted in the terminal body, or may be detachably mounted to the terminal body.

A touch pad 135 for sensing touch may be additionally mounted to the rear case 102. Like the display unit 151 (refer to FIG. 2A), the touch pad 135 may be formed to be light-transmissive. The touch pad 135 may be also additionally mounted with a rear display unit for outputting visual information. Information output from the display unit 151 (front display) and the rear display can be controlled by the touch pad 135.

The touch pad 135 operates in association with the display unit 151. The touch pad 135 may be disposed on the rear surface of the display unit 151 in parallel. The touch pad 135 may have a size equal to or smaller than that of the display unit 151.

The sound output module 152 for outputting a sound may be mounted to the mobile terminal 100. A user can control a volume level of a sound using the user input unit 132 provided at the mobile terminal. Generally, information on a controlled volume level may be displayed on the display unit 151 of the mobile terminal. However, in a case where the user cannot view the display unit 151 due to a call or other reasons, the user cannot easily check whether the controlled volume level is a preset volume level or not.

Hereinafter, the mobile terminal 100 capable of allowing a user to easily check whether a controlled volume level corresponds to a preset volume level, and a control method thereof will be explained with reference to the attached drawings.

FIG. 3 is a flowchart showing an embodiment of the mobile terminal 100 (refer to FIG. 1) according to the present invention.

The mobile terminal 100 includes the sound output module 152 (refer to FIG. 1), the user input unit 132 (refer to FIG. 1) and the controller 180 (refer to FIG. 1).

Referring to FIG. 3, a sound is output from the sound output module 152 (S110).

More specifically, the sound output module 152 is called a speaker, and may be formed in one or more. The sound output module 152 is configured to convert an electric signal into a signal of an audible frequency band by making a vibration plate vibrate.

Next, a control command applied to the user input unit 132 so as to control a volume level of a sound is sensed (S120).

Next, a volume level of a sound is controlled based on the sensed control command (S130).

The user input unit 132 may be positioned on the side surface of the front case 101 (refer to FIG. 2A) and the rear case 102 (refer to FIG. 2A). The user input unit 132 is manipulated so as to input a command for controlling the operation of the mobile terminal 100. For instance, the user input unit 132 is used to control a volume level of a sound output from the sound output unit 152.

To this end, the user input unit 132 may include a side up key for increasing a volume level of a sound, and a side down key for decreasing a volume level of a sound. The user can control a volume level of a sound using the side up key or the side down key, while performing a call or viewing moving images.

The user input unit 132 may include the display unit 151. The user can also control a volume level of a sound by performing a touch input with respect to a user interface menu of the display unit 151.

The aforementioned user input unit 132 may be applied to all embodiments of the present invention.

Next, it is determined whether the controlled volume level corresponds to a preset volume level (S140).

Here, the preset volume level may not be preset by a user, but may be preset in the mobile terminal 100. Alternatively, the preset volume level may be preset by a user.

The preset volume level may include a maximum volume level and a minimum volume level, among a plurality of reference volume levels controllable according to a control command applied to the user input unit 132. The controller 180 may determine whether the controlled volume level corresponds to the maximum volume level or the minimum volume level.

Next, if the controlled volume level corresponds to the preset volume level, a signal corresponding to the preset volume level is output in the form of a signal different from the output sound (S150).

If the controlled volume level corresponds to one of the maximum volume level and the minimum volume level, the controller 180 may output, for a preset time, at least one of an effective sound signal and a vibration signal corresponding to the maximum or minimum volume level.

The controller 180 may output an effective sound signal using an output sound. For instance, the controller 180 may provide a bounce effect to an output sound. If the controlled volume level corresponds to the maximum volume level, the controller may provide a bounce effect to an output sound, within the range between the maximum volume level and a volume level lower than the maximum volume level by one level. On the contrary, if the controlled volume level corresponds to the minimum volume level, the controller may provide a bounce effect to an output sound, within the range between the minimum volume level and a mute level.

The controller 180 may output an effective sound signal unrelated to an output sound. That is, if the controlled volume level corresponds to one of the maximum volume level and the minimum volume level, the controller 180 may output a beep sound or a preset sound. Here, the preset sound may be a sound set by a user, or a sound set in the mobile terminal 100.

If the controlled volume level corresponds to one of the maximum volume level and the minimum volume level, the controller 180 may control the display unit 151 (refer to FIG. 1) to flicker for a preset time.

In a case where the display unit 151 is implemented as a flexible display, if the controlled volume level corresponds to one of the maximum volume level and the minimum volume level, the controller 180 may change the shape of the display unit 151. Accordingly, a user can easily check whether the controlled volume level corresponds to the maximum volume level or the minimum volume level even during a call.

If the controlled volume level corresponds to one of the maximum volume level and the minimum volume level, the controller 180 may not utilize a control command applied to the user input unit 132 when controlling a volume level. More specifically, the controller 180 may lock one of the side up key and the side down key. And, the controller 180 may control a user to have other touch feeling when pressing the user input unit 132. For instance, the controller 180 may generate an electric signal or a vibration signal (e.g., haptic effect) on the user input unit 132.

The user can check whether a controlled volume level corresponds to a preset volume level by the aforementioned audible, visual and physical effects. The controller 180 may apply at least part of the aforementioned effects. Such effects may be commonly applied to the following embodiments.

As aforementioned, if a controlled volume level corresponds to a preset volume level, an effect sound signal or a vibration signal corresponding to the preset volume level is output. This can allow a user to easily check whether a controlled volume level corresponds to a preset volume level or not, even when the user cannot view the display unit 151 of the mobile terminal 100 due to a call or other reasons. This can enhance the user's convenience.

Figure 4:
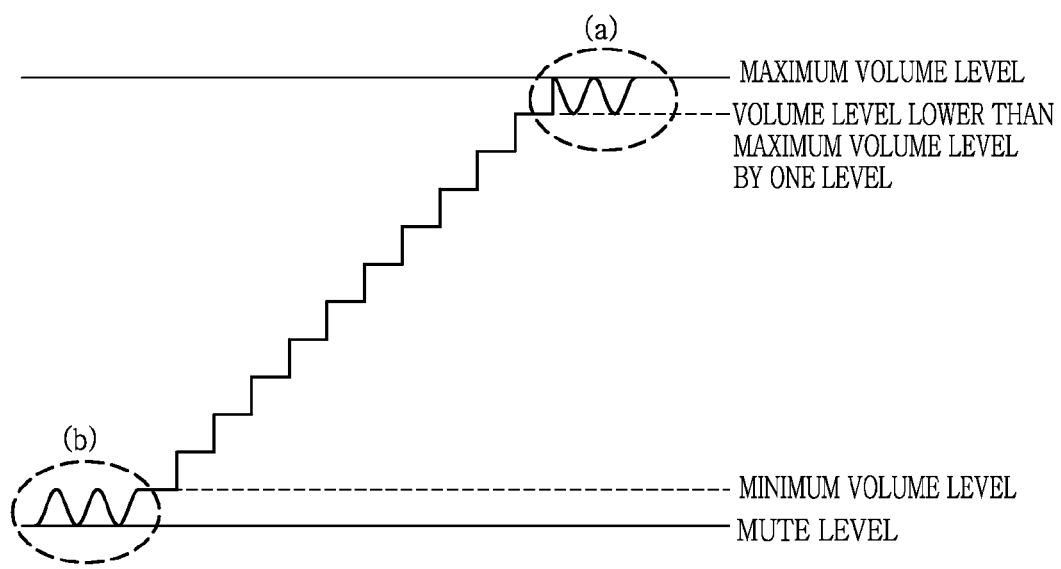
FIG. 4 is a conceptual view showing an operation example associated with a sound bounce of a mobile terminal of FIG. 3.

FIG. 4 is a conceptual view showing an operation example associated with a sound bounce of the mobile terminal 100 (refer to FIG. 1) of FIG. 3.

The mobile terminal 100 includes the sound output module 152 (refer to FIG. 1), the user input unit 132 (refer to FIG. 1) and the controller 180 (refer to FIG. 1).

FIG. 4 shows a plurality of reference volume levels controllable according to a control command applied to the user input unit 132, in the form of graphs.

If a controlled volume level corresponds to the maximum volume level, the controller 180 may provide a bounce effect to an output sound so that the sound can be repeatedly output, within the range between the maximum volume level and a volume level lower than the maximum volume level by one level. That is, a voice signal output from another party or a moving image can be repeatedly output, within the range between the maximum volume level and a volume level lower than the maximum volume level by one level.

Such bounce effect may be maintained for a preset time. And, the bounce effect may be stopped when the current volume level is controlled into another volume level according to a control command applied to the user input unit 132.

Likewise, if a controlled volume level corresponds to the minimum volume level, the controller 180 may provide a bounce effect to an output sound so that the sound can be repeatedly output, within the range between the minimum volume level and a mute level. That is, a voice signal output from another party or a moving image can be repeated output, within the range between the minimum volume level and the mute level.

Such bounce effect may be maintained for a preset time. And, the bounce effect may be stopped when a volume level controlled according to a control command applied to the user input unit 132 corresponds to another volume level or the mute level.

FIGS. 5A to 5D are conceptual views showing a first operation example of the mobile terminal 100 of FIG. 3.

The mobile terminal 100 includes the sound output module 152, the user input unit 132 and the controller 180. The user input unit 132 may include a side up key 132a and a side down key 132b. Although not shown, a user may perform a call with another party, or may view moving images using the mobile terminal 100.

Figure 5A:
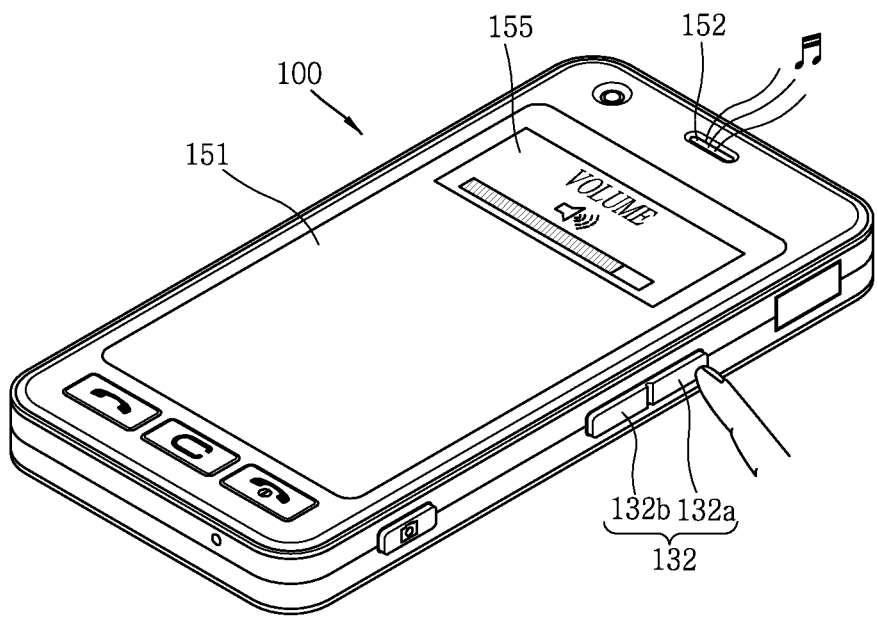
FIGS. 5A to 5D are conceptual views showing a first operation example of a mobile terminal of FIG. 3.

Referring to FIG. 5A, the sound output module 152 may output a sound. Even if a user cannot view a volume level during a call, the display unit 151 (refer to FIG. 1) can display information about a volume level of an output sound. While the user views moving images, information about a volume level of an output sound may not be displayed on the display unit 151 so as to prevent the moving images from being covered by the information.

If a control command applied to the user input unit 132 is sensed, i.e., if a control command applied to the side up key 132a so as to increase a volume level of a sound is sensed, the controller 180 may increase a volume level of a sound based on the control command. And, the controller 180 may determine whether a controlled volume level corresponds to a preset volume level, e.g., the maximum volume level.

Figure 5B:
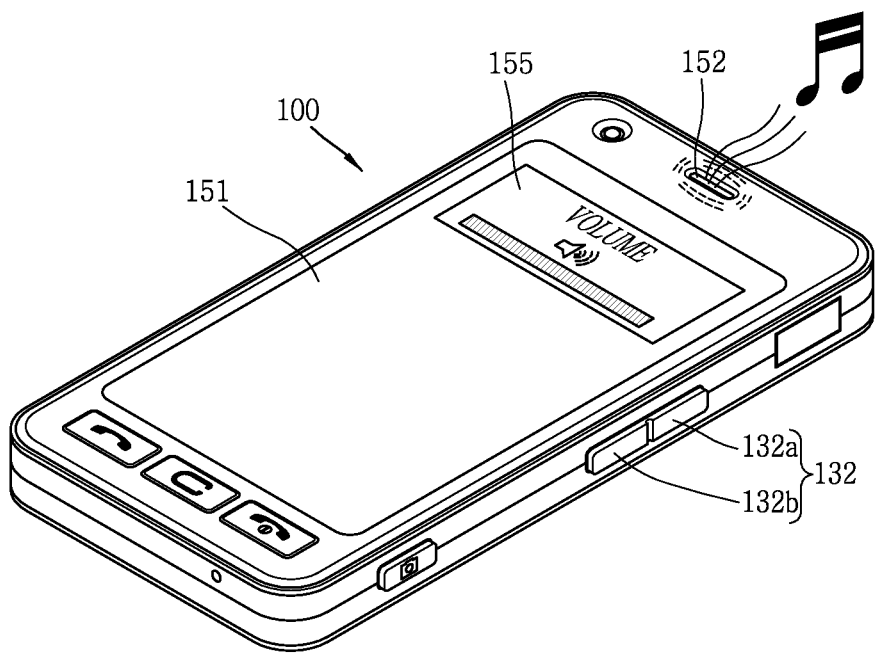

Referring to FIG. 5B, if the controlled volume level corresponds to the maximum volume level, the display unit 151 may display information indicating that a volume level of an output sound is the maximum volume level. And, the controller 180 may output a vibration signal corresponding to the maximum volume level while outputting a sound at the controlled volume level, i.e., while outputting a sound at the maximum volume level. Here, the vibration signal may be output for a preset time. The preset time may be set by a user, or may be set in the mobile terminal 100.

Generally, the sound output module 152 is configured to convert an electric signal into a sound of an audible frequency band, by making a vibration plate vibrate. If a signal having a limited range of frequency is applied to the sound output module 152, a user can sense vibration generated from the vibration plate. Therefore, vibration can be generated from the sound output module 152 according to a signal applied to the sound output module 152.

Figure 5C:
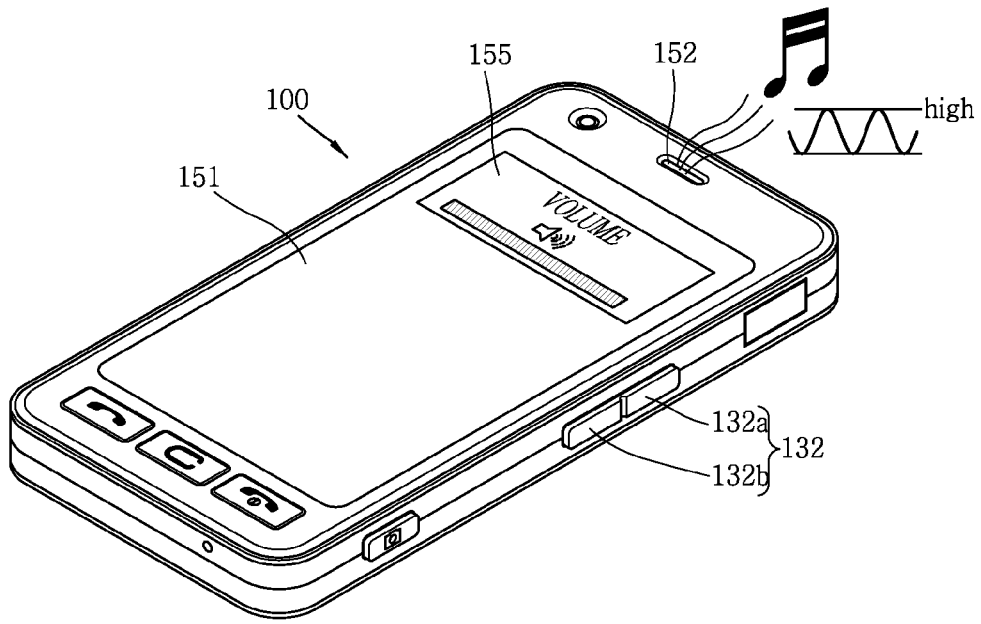

Referring to FIG. 5C, if a controlled volume level corresponds to the maximum volume level, the controller 180 may provide bounce effect to an output sound so that the sound can be repeatedly output, within the range between the maximum volume level and a volume level lower than the maximum volume level by one level. That is, a voice signal output from another party or a moving image can be repeatedly output, within the range between the maximum volume level and a volume level lower than the maximum volume level by one level.

Figure 5D:
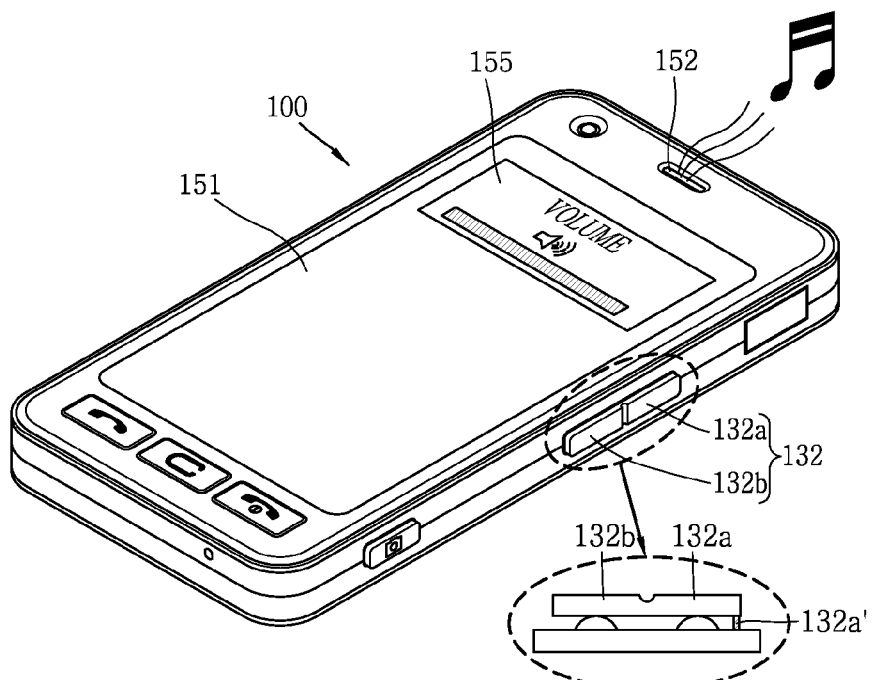

Referring to FIG. 5D, if a controlled volume level corresponds to the maximum volume level, the controller 180 may ignore a control command applied to the side up key 132a, while outputting a sound at the controlled volume level, i.e., while outputting a sound at the maximum volume level.

More specifically, the controller 180 may not utilize a control command applied to the side up key 132a when controlling a volume level. As shown, the controller 180 may lock the side up key 132a. In this case, the controller 180 may generate a control signal so that a member 132a' for preventing the side up key 132a from being pressed can be disposed at a lower end of the side up key 132a.

Although not shown, the controller 180 may control a user to have another touch feeling when pressing the side up key 132a. For instance, the controller 180 may generate an electric signal or a vibration signal (e.g. haptic effect) on the side up key 132a.

If a controlled volume level corresponds to the maximum volume level, the controller 180 may apply at least some of the aforementioned effects indicating the maximum volume level.

FIGS. 6A to 6D are conceptual views showing a second operation example of the mobile terminal 100 of FIG. 3.

The mobile terminal 100 includes the sound output module 152, the user input unit 132 and the controller 180. The user input unit 132 may include a side up key 132a and a side down key 132b.

Figure 6A:
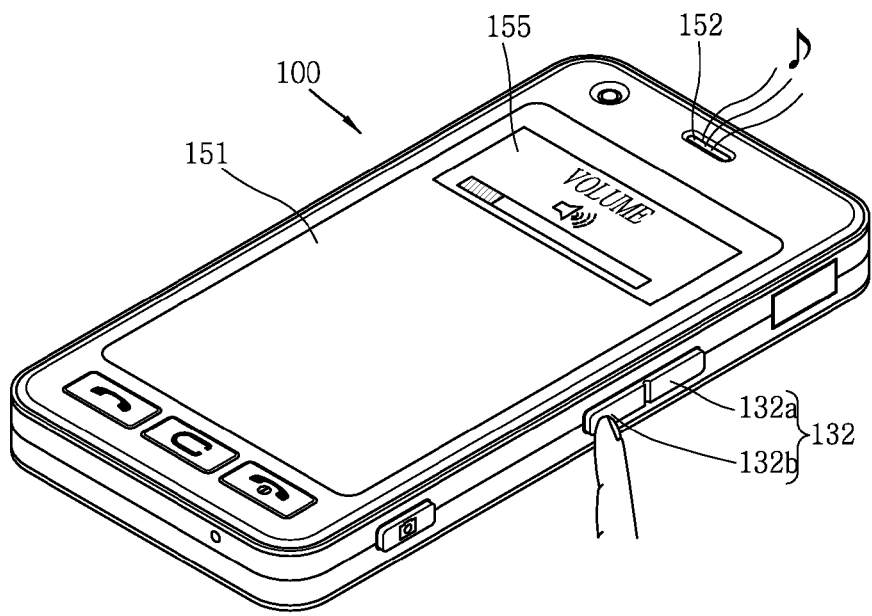
FIGS. 6A to 6D are conceptual views showing a second operation example of a mobile terminal of FIG. 3.

Referring to FIG. 6A, the sound output module 152 may output a sound. If a control command for decreasing a volume level of a sound is applied to the user input unit 132, the controller 180 may decrease a volume level of an output sound based on the control command. And, the controller 180 may determine whether a controlled volume level corresponds to a preset volume level, e.g., the minimum volume level.

Figure 6B:
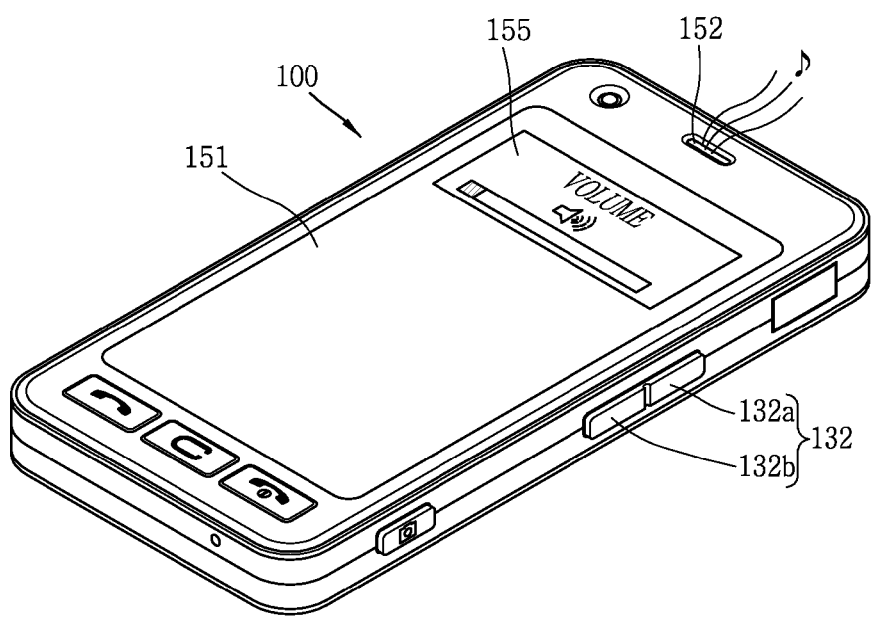

Referring to FIG. 6B, if the controlled volume level corresponds to the minimum volume level, the display unit 151 may display information indicating that a volume level of an output sound is the minimum volume level. And, the controller 180 may output a vibration signal corresponding to the minimum volume level, while outputting a sound at the controlled volume level, i.e., while outputting a sound at the minimum volume level. Here, the vibration signal may be output for a preset time.

Figure 6C:
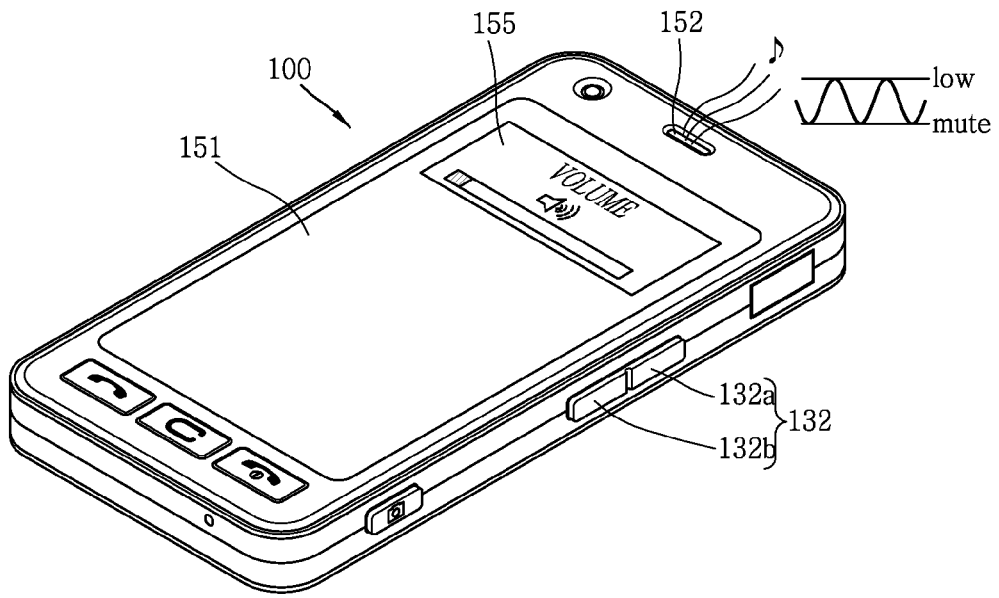

Referring to FIG. 6C, if the controlled volume level corresponds to the minimum volume level, the controller 180 may provide a bounce effect to an output sound so that the sound can be repeatedly output, within the range between the minimum volume level and a mute level. That is, a voice signal output from another party or a moving image can be repeatedly output, within the range between the minimum volume level and the mute level for a preset time.

Figure 6D:
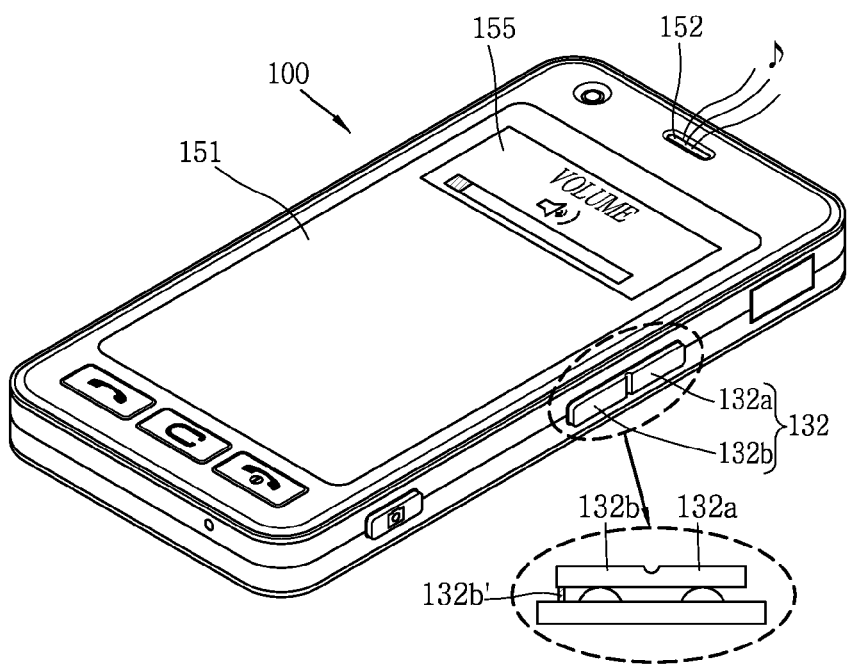

Referring to FIG. 6D, if the controlled volume level corresponds to the mute level, the controller 180 may control a sound to be mute, and may ignore a control command applied to the side down key 132b.

More specifically, the controller 180 may not utilize a control command applied to the side down key 132b when controlling a volume. As shown, the controller 180 may lock the side up key 132a. In this case, the controller 180 may generate a control signal so that a member 132a' for preventing the side down key 132b from being pressed can be disposed at a lower end of the side down key 132b.

If the controlled volume level corresponds to the minimum volume level, the controller 180 may apply at least some of the aforementioned effects indicating the minimum volume level.

FIGS. 7A to 7D are conceptual views showing a third operation example of a mobile terminal of FIG. 3.

The mobile terminal 100 includes the sound output module 152, the user input unit 132 and the controller 180. The user input unit 132 may include a side up key 132a and a side down key 132b. And, the mobile terminal 100 may further include an operation recognition sensor (not shown) and a camera 121.

The operation recognition sensor is configured to receive a video signal through the camera 121 or an infrared ray sensor (not shown), and to recognize a user's operation based on the received signal. The camera 121 may be provided in one or more, and may be configured to capture at least one of a user's images which are within a predetermined range based on the terminal body, e.g., still images and moving images.

If a user's motion is sensed by the operation recognition sensor, the controller 180 may generate a control signal for controlling a function of the mobile terminal, based on the sensed motion. The memory 160 (refer to FIG. 1) may store therein control commands corresponding to the user's motions. Then, if the user's motion is sensed by the operation recognition sensor, the controller 180 may extract, from the memory 160, a control command corresponding to the user's motion.

Figure 7A:
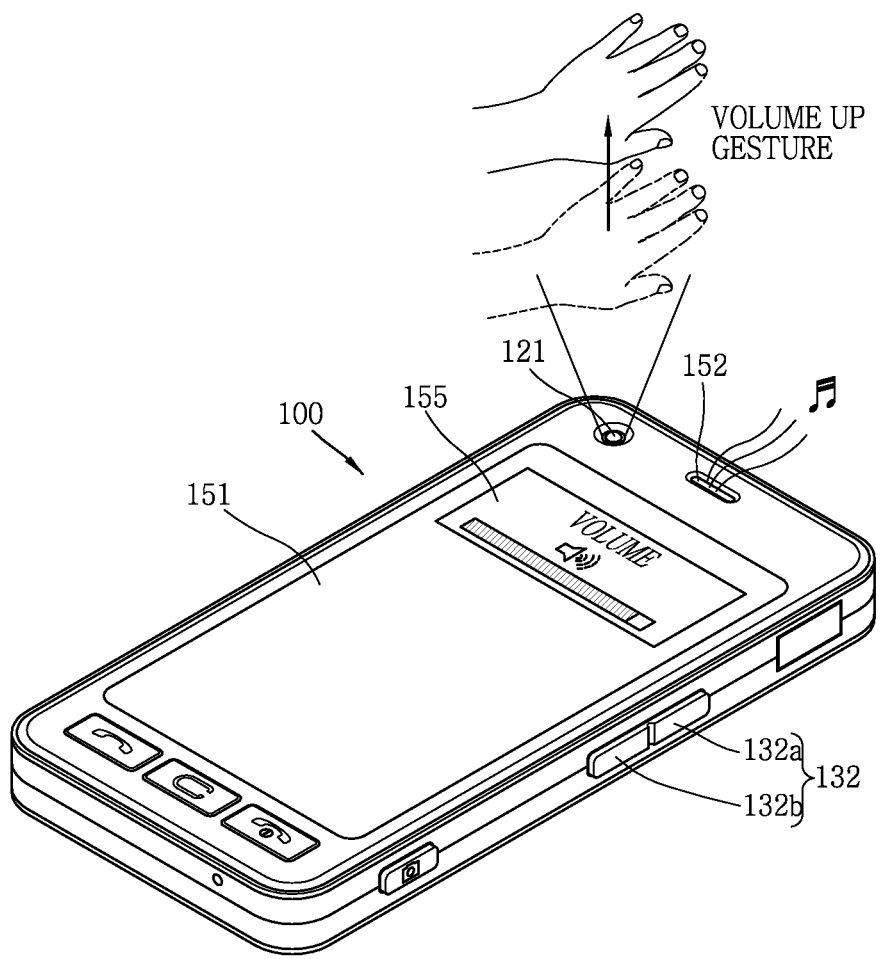
FIGS. 7A to 7D are conceptual views showing a third operation example of a mobile terminal of FIG. 3.

Referring to FIG. 7A, if a user's motion, i.e., a control command for increasing a volume level of an output sound is sensed by the operation recognition sensor, the controller 180 may increase a volume level of an output sound based on the control command. And, the controller 180 may determine whether a controlled volume level corresponds to a preset volume level, e.g., the maximum volume level.

Figure 7B:
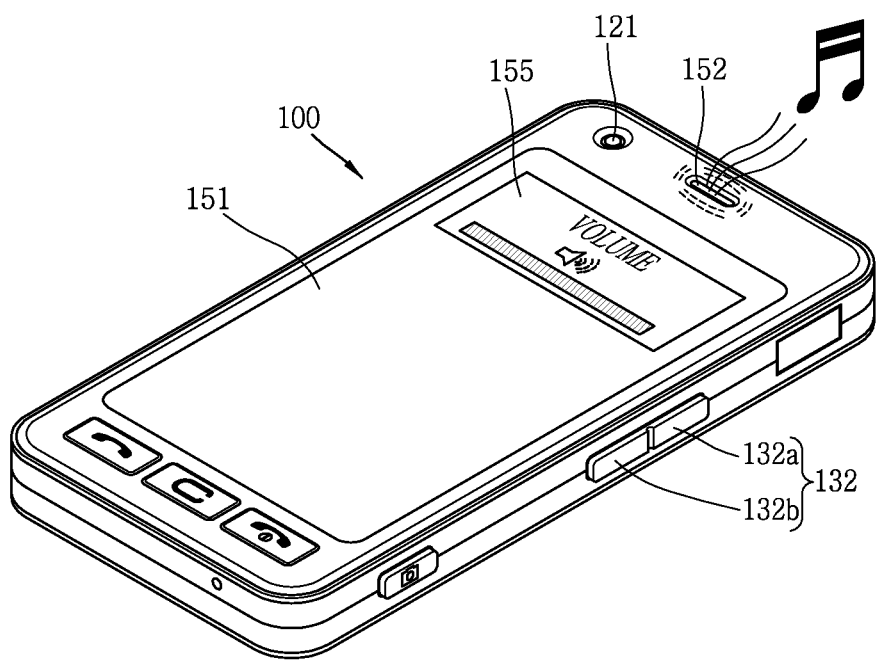

Referring to FIG. 7B, if the controlled volume level corresponds to the maximum volume level, the controller 180 may output a vibration signal corresponding to the maximum volume level while outputting a sound at the maximum volume level. Here, the vibration signal may be output for a preset time.

Figure 7C:
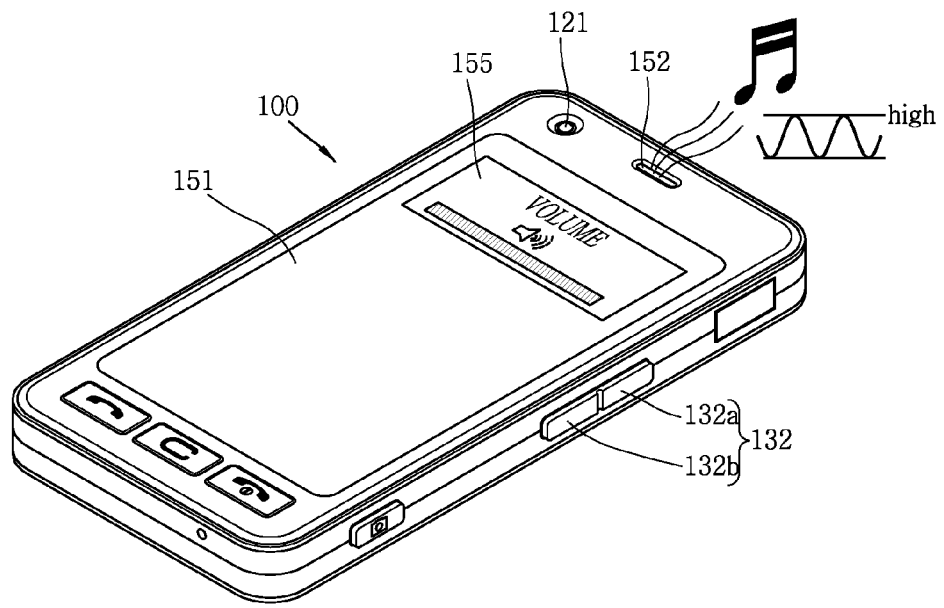

Referring to FIG. 7C, if the controlled volume level corresponds to the maximum volume level, the controller 180 may provide a bounce effect to an output sound so that the sound can be repeatedly output, within the range between the maximum volume level and a volume level lower than the maximum volume level by one level. That is, a voice signal output from another party or a moving image can be repeatedly output, within the range between the maximum volume level and a volume level lower than the maximum volume level by one level.

Although not shown, the controller 180 may provide a bounce effect to an output sound. And, the controller 180 may output an effective sound signal unrelated to an output sound. That is, the controller 180 may output a beep sound or a preset sound.

Figure 7D:
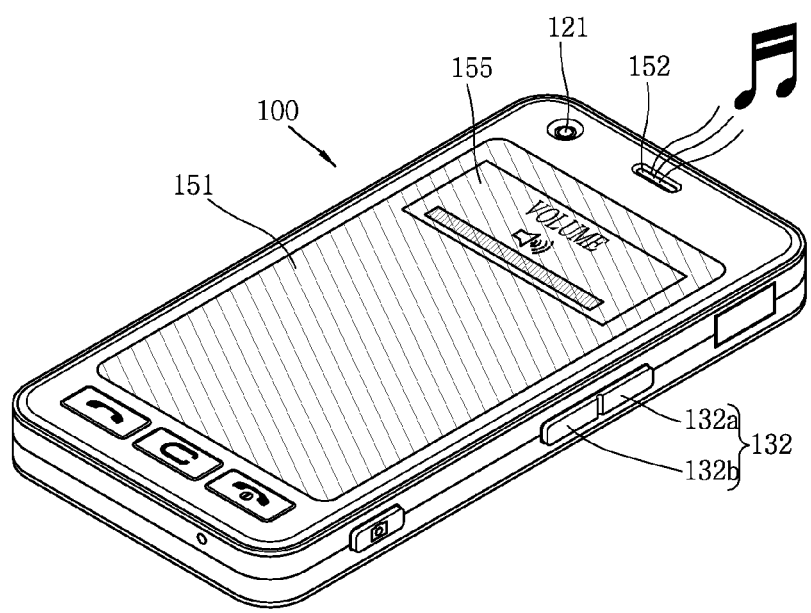

Referring to FIG. 7D, if the controlled volume level corresponds to the maximum volume level, the controller 180 may control the display unit 151 to flicker, for a preset time duration, a preset number of times. And, the controller 180 may control the display unit 151 to flicker for a preset time duration. If the display unit 151 is formed in plurality in number, at least one of the plurality of display units 151 may flicker.

The controller 180 may control a lamp additionally provided outside the terminal body or light to flicker a preset number of times. The lamp or the light may be implemented as a light emitting diode (LED) or a liquid crystal display (LCD). The controller 180 may control the lamp or the light to flicker for a preset time.

Alternatively, the controller 180 may display, on the display unit 151, information indicating that a volume level of an output sound is the maximum volume level. For instance, the controller 180 may display, on the display unit 151, a text message or a graphic message including information indicating that a volume level of an output sound is the maximum volume level. Still alternatively, the controller 180 may display, on the display unit 151, a pop-up window including information indicating that a volume level of an output sound is the maximum volume level.

FIGS. 7A to 7D show that the operation recognition sensor senses a control command for increasing a volume level of a sound. However, one embodiment of the present invention can be also applied to a case where the operation recognition sensor senses a control command for decreasing a volume level of a sound.

When a controlled volume level corresponds to a preset volume level, the aforementioned audible, visual and physical effects can be commonly applied to the following embodiments.

Figure 8A:
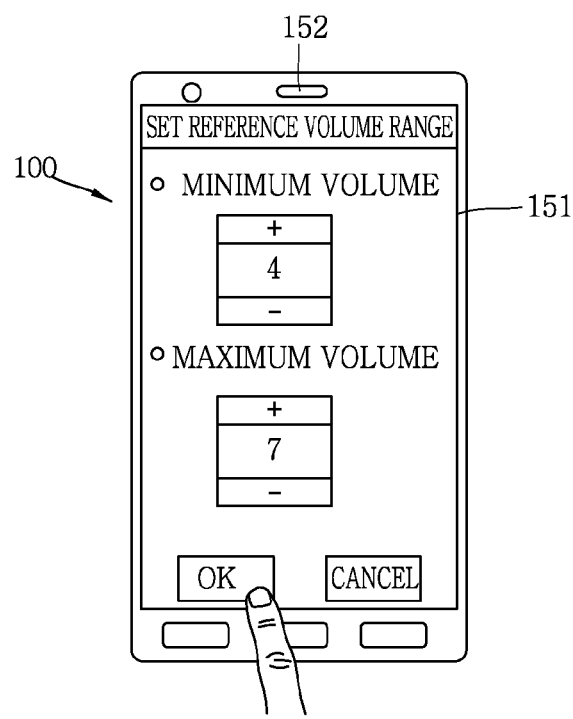
FIGS. 8A to 8C are conceptual views showing a fourth operation example of a mobile terminal of FIG. 3.
Figure 8B:
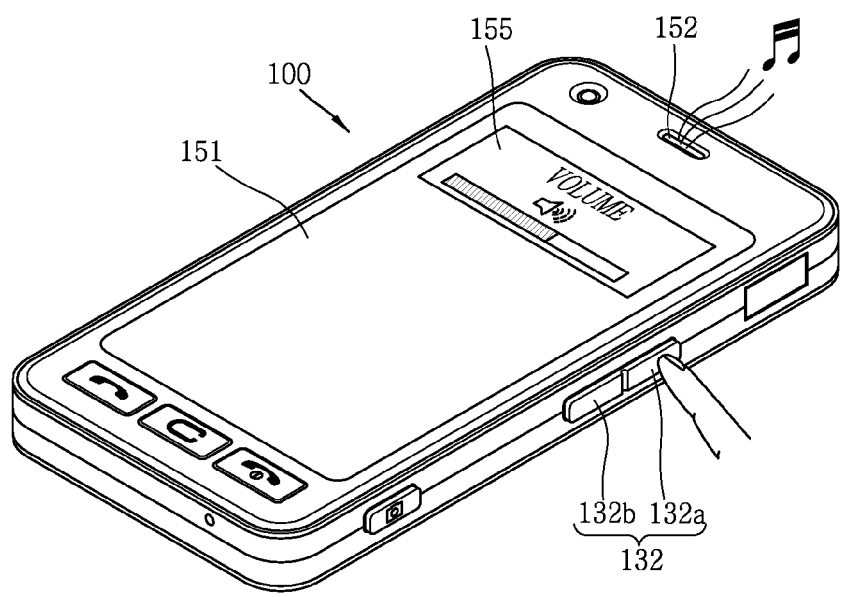
Figure 8C:
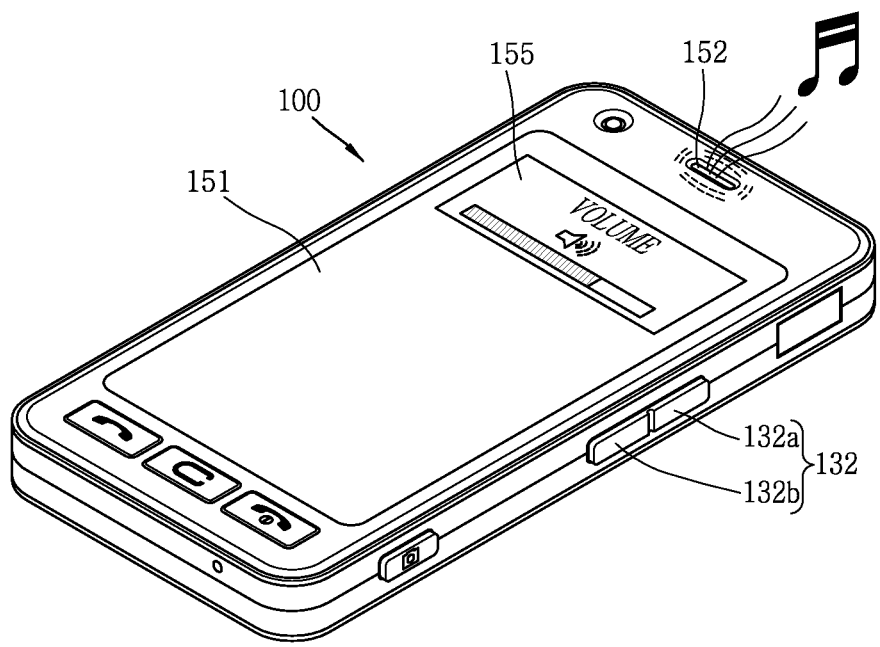

FIGS. 8A to 8C are conceptual views showing a fourth operation example of a mobile terminal of FIG. 3. The mobile terminal 100 includes the sound output module 152, the user input unit 132 and the controller 180. The user input unit 132 may include a side up key 132a and a side down key 132b.

Referring to FIG. 8A, a user may set a minimum volume level and a maximum volume level for outputting an additional signal. In drawings, both of a minimum volume level setting menu and a maximum volume level setting menu are illustrated. However, either the minimum volume level setting menu or the maximum volume level setting menu may be displayed on the display unit 151 (refer to FIG. 1). And, display time points for the minimum volume level setting menu and the maximum volume level setting menu may be different from each other. For instance, one of the minimum volume level setting menu and the maximum volume level setting menu may be firstly displayed on the display unit 151, and then another thereof may be displayed on the display unit 151.

Each of the minimum volume level setting menu and the maximum volume level setting menu may be set based on a touch input applied to one of "+" and "−" icons, or based on an input applied to one of the side up key 132a and the side down key 132b. Alternatively, the minimum volume level setting menu and the maximum volume level setting menu may be set based on a touch input with respect to a physical keypad or a virtual keypad.

Referring to FIG. 8B, if a control command applied to the user input unit 132 is sensed, i.e., if a control command applied to the side up key 132a so as to increase a volume level of an output sound is sensed, the controller 180 may increase a volume level of an output sound based on the control command. And, the controller 180 may determine whether the controlled volume level corresponds to a preset maximum volume level.

Referring to FIG. 8C, if the controlled volume level corresponds to the preset maximum volume level, the controller 180 may output a vibration signal corresponding to the maximum volume level while outputting a sound at the controlled volume level, i.e., while outputting a sound at the maximum volume level.

Although not shown, the controller 180 may provide a bounce effect to an output sound so that the sound can be repeatedly output between the maximum volume level and a volume level lower than the maximum volume level by one level. The controller 180 may ignore a control command applied to the side up key 132a, while outputting a sound at the controlled volume level, i.e., while outputting a sound at the maximum volume level. And, the display unit 151 may display information indicating that a volume level of an output sound is the preset maximum volume level.

If the controlled volume level corresponds to the maximum volume level, the controller 180 may apply at least some of the aforementioned effects indicating the maximum volume level.

FIGS. 9A to 9D are conceptual views showing a fifth operation example of the mobile terminal 100 of FIG. 3.

The mobile terminal 100 includes the sound output module 152, the user input unit 132 and the controller 180. The user input unit 132 may include a side up key 132a and a side down key 132b.

Figure 9A:
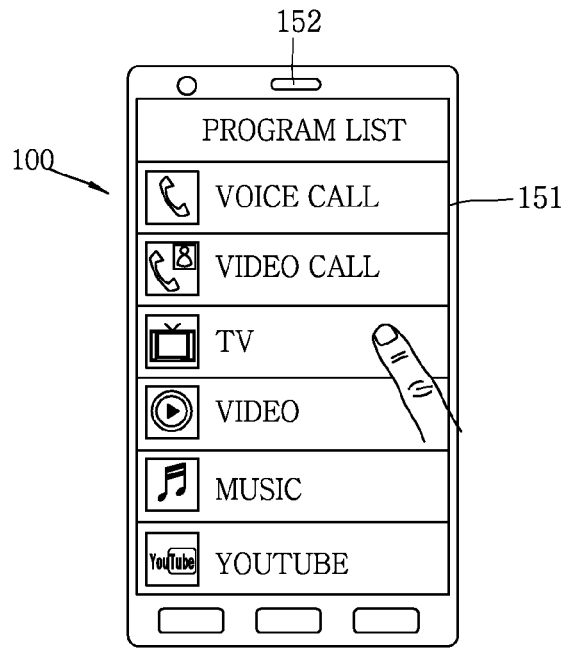
FIGS. 9A to 9D are conceptual views showing a fifth operation example of a mobile terminal of FIG. 3.
Figure 9B:
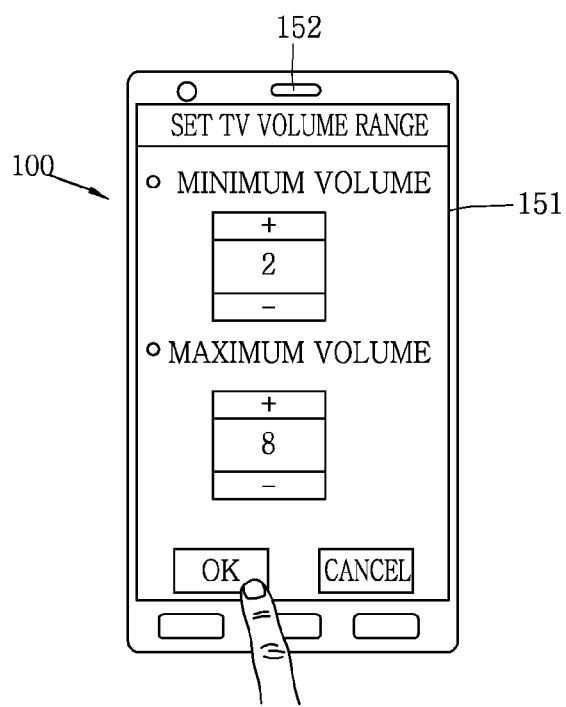

Referring to FIG. 9A, a user may set a minimum volume level and a maximum volume level for outputting an additional signal with respect to each of application programs. As shown, the display unit 151 may display a list of application programs. Referring to FIG. 9B, if at least one of the application programs, e.g., a TV application is selected, the user may set a minimum volume level and a maximum volume level for outputting an additional signal when executing the TV application.

Although not shown, a plurality of the application programs may be selected. Here, the set minimum and maximum volume levels may be simultaneously applied to the selected plurality of application programs.

Figure 9C:
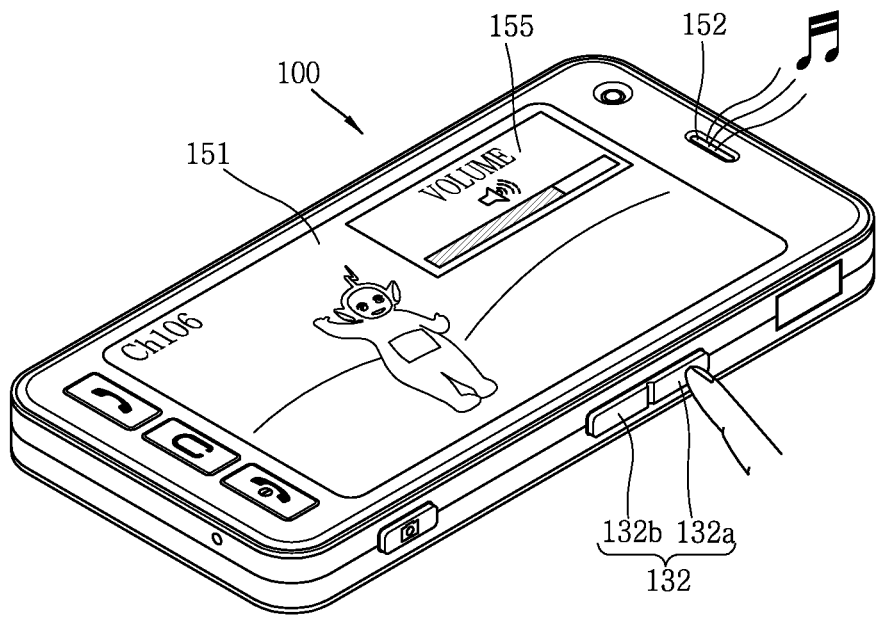

Referring to FIG. 9C, if a control command applied to the user input unit 132 is sensed while a TV application is being executed, i.e., if a control command applied to the side up key 132a so as to increase a volume level of an output sound is sensed, the controller 180 may increase a volume level of a sound based on the control command. And, the controller 180 may determine whether the controlled volume level corresponds to the preset maximum volume level.

Figure 9D:
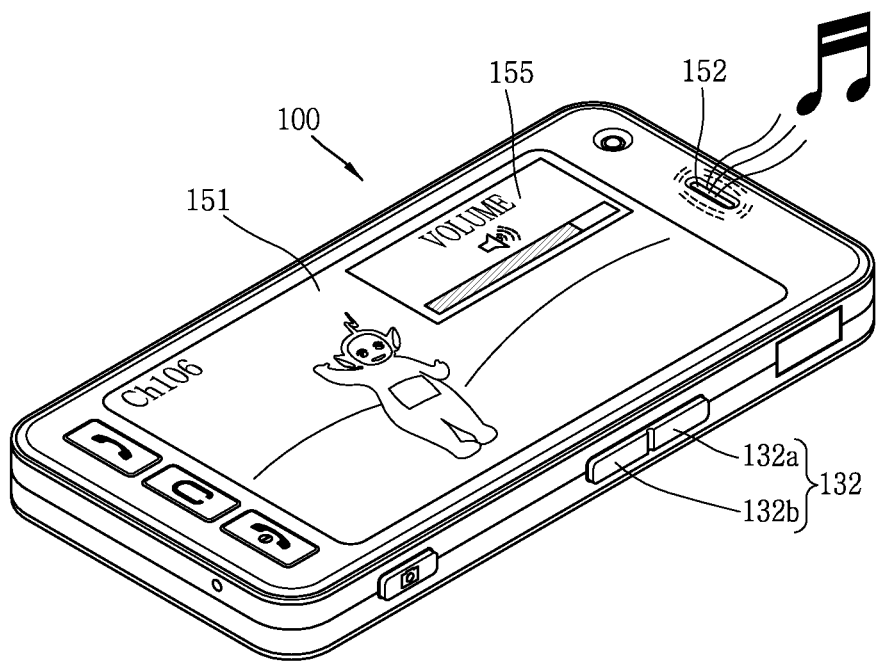

Referring to FIG. 9D, if the controlled volume level corresponds to the preset maximum volume level, the controller 180 may output a vibration signal corresponding to the maximum volume level while outputting a sound at the controlled volume level, i.e., while outputting a sound at the maximum volume level.

Although not shown, the controller 180 may provide a bounce effect to an output sound so that the sound can be repeatedly output, within the range between the maximum volume level and a volume level lower than the maximum volume level by one level. The controller 180 may ignore a control command applied to the side up key 132a, while outputting a sound at the controlled volume level, i.e., while outputting a sound at the maximum volume level. And, the display unit 151 may display information indicating that a volume level of an output sound is the preset maximum volume level.

If the controlled volume level corresponds to the maximum volume level, the controller 180 may apply at least some of the aforementioned effects indicating the maximum volume level.

FIG. 10 is a flowchart showing another embodiment of the mobile terminal 100 (refer to FIG. 1) according to the present invention.

The mobile terminal 100 includes a sound output module 152 (refer to FIG. 1), the user input unit 132 (refer to FIG. 1) and the controller 180 (refer to FIG. 1). The contents aforementioned with reference to FIG. 3 will not be explained any longer.

Referring to FIG. 10, a sound is output from the sound output module 152 (S210).

Next, a control command and an input pattern each applied to the user input unit 132 so as to control a volume level of an output sound are sensed (S220). More specifically, the controller 180 may sense an input pattern based on an input time applied to the user input unit 132.

Next, a volume level of a sound is controlled based on the sensed control command (S230).

Next, it is determined whether the controlled volume level corresponds to a preset volume level (S240).

Next, if the controlled volume level corresponds to the preset volume level, it is determined whether to output a signal corresponding to the preset volume level, based on the sensed input pattern (S250).

For instance, the preset volume level may include a maximum volume level and a minimum volume level among a plurality of reference volume levels which can be controlled according to a control command applied to the user input unit 132.

The controller 180 may not output a signal corresponding to the preset volume level when the sensed input pattern is a preset input pattern, even if the controlled volume level corresponds to one of the maximum volume level and the minimum volume level.

For instance, when an input time applied to the user input unit 132 is more than a preset time, i.e., when an input is applied to the user input unit for a long time, the controller 180 does not output an effect sound signal or a vibration signal even if the controlled volume level corresponds to one of the maximum volume level and the minimum volume level.

Figure 11:
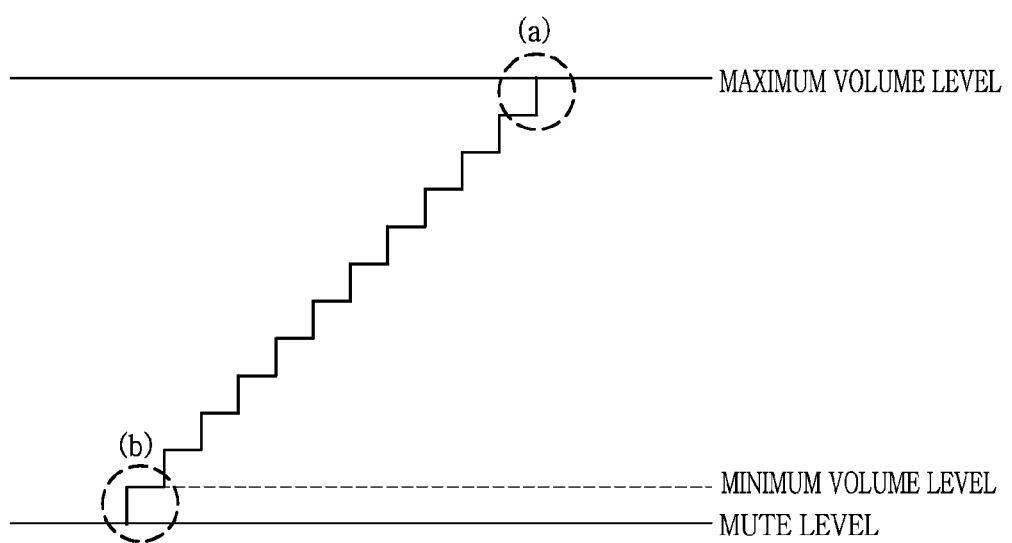
FIG. 11 is a conceptual view showing an operation example associated with a sound bounce of a mobile terminal of FIG. 10.

FIG. 11 is a conceptual view showing an operation example associated with a sound bounce of the mobile terminal 100 of FIG. 10 (refer to FIG. 1).

The mobile terminal 100 includes the sound output module 152 (refer to FIG. 1), the user input unit 132 (refer to FIG. 1) and the controller 180 (refer to FIG. 1).

FIG. 11 shows a plurality of reference volume levels which can be controlled according to a control command applied to the user input unit 132, in the form of graphs.

In a case where a controlled volume level corresponds to one of the maximum volume level and the minimum volume level, the controller 180 may determine whether to provide a bounce effect to an output sound or not according to an input pattern applied to the user input unit 132.

For instance, as shown in FIG. 4, in a case where an input is repeatedly applied to the user input unit for a short time, the controller 180 may provide a bounce effect to an output sound when the controlled volume level corresponds to the maximum volume level. On the other hand, as shown in FIG. 10, in a case where an input is applied to the user input unit 132 for a long time, if the controlled volume level corresponds to the maximum volume level, the controller 180 may not provide a bounce effect to an output sound, and may output a sound at the maximum volume level.

Even if the controlled volume level corresponds to the minimum volume level, the same operation may be performed. In a case where an input is applied to the user input unit 132 for a long time, if the controlled volume level corresponds to the minimum volume level, the controller 180 may not provide a bounce effect to an output sound, but may output a sound at the minimum volume level. The controller 180 may control a sound to be mute according to an input applied to the user input unit 132.

Figure 12A:
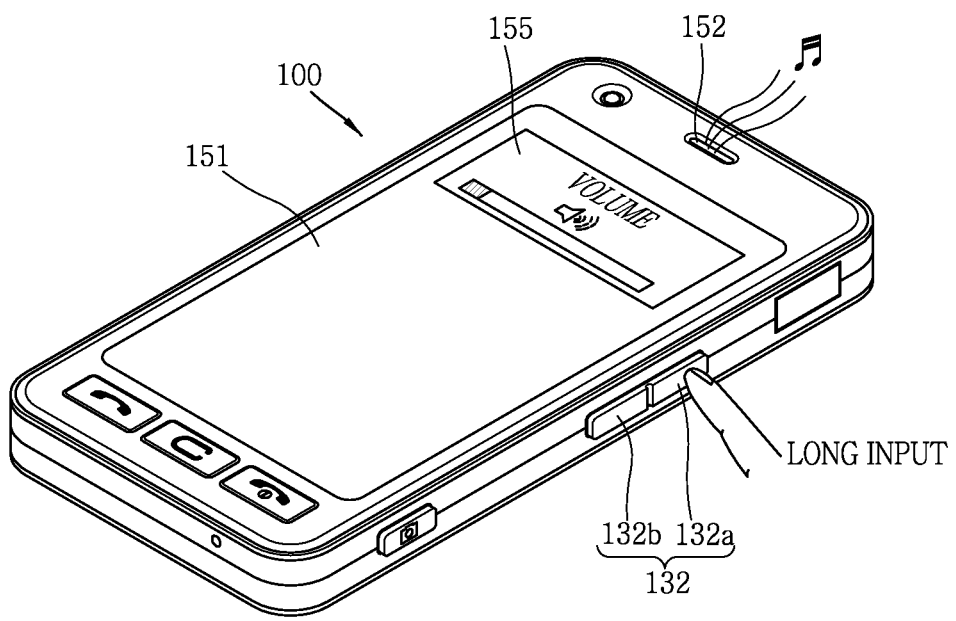
FIGS. 12A and 12B are conceptual views showing a first operation example of a mobile terminal of FIG. 10.
Figure 12B:
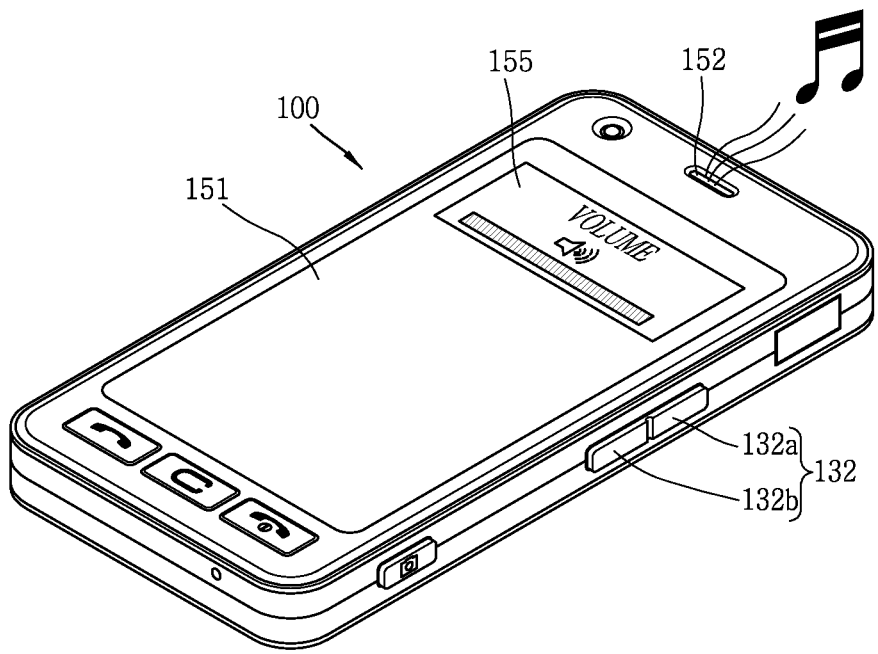

FIGS. 12A and 12B are conceptual views showing a first operation example of the mobile terminal 100 of FIG. 10.

The mobile terminal 100 includes the sound output module 152, the user input unit 132 and the controller 180. The user input unit 132 may include a side up key 132a and a side down key 132b. Although not shown, a user may perform a call with another party, or may view moving images using the mobile terminal 100.

Referring to FIG. 12A, the sound output module 152 may output a sound. If a control command applied to the user input unit 132 is sensed, i.e., if a control command for increasing a volume level of a sound is applied to the side up key 132a, the controller 180 may sense an input pattern applied to the side up key 132a. Accordingly, an input applied to the side up key 132a for a long time may be sensed.

The controller 180 may increase a volume level of a sound based on a control command. And, the controller 180 may determine whether the controlled volume level corresponds to a preset volume level, e.g., the maximum volume level.

Referring to FIG. 12B, if the controlled volume level corresponds to the maximum volume level, the controller 180 may output a sound at the maximum volume level. That is, unlike in FIGS. 5B and 5C, the controller 180 neither outputs a vibration signal, nor provides a bounce effect to an output sound. However, as shown in FIG. 5D, the controller 180 may ignore a control command applied to the side up key 132a.

Figure 13A:
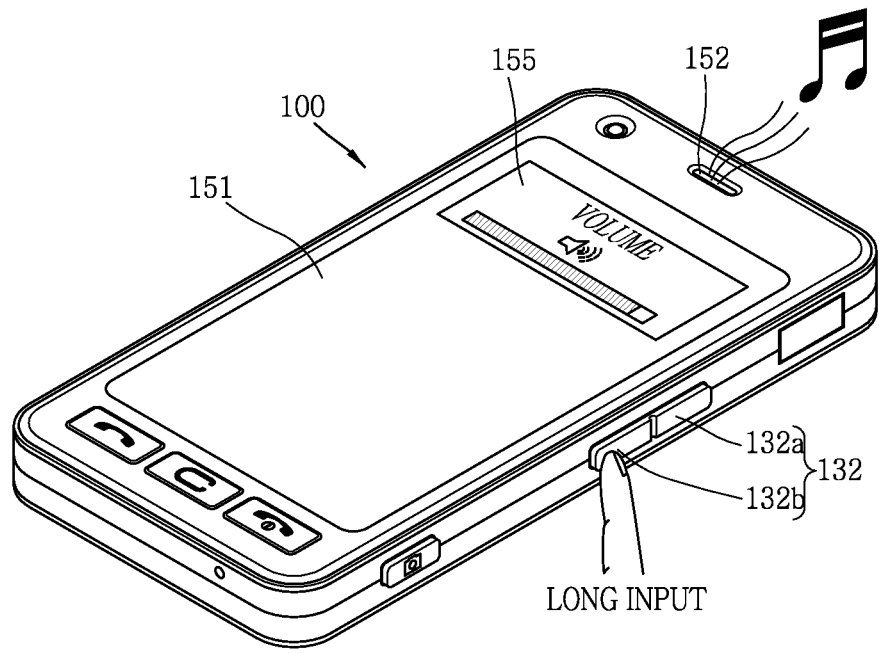
FIGS. 13A and 13B are conceptual views showing a second operation example of a mobile terminal of FIG. 10.
Figure 13B:
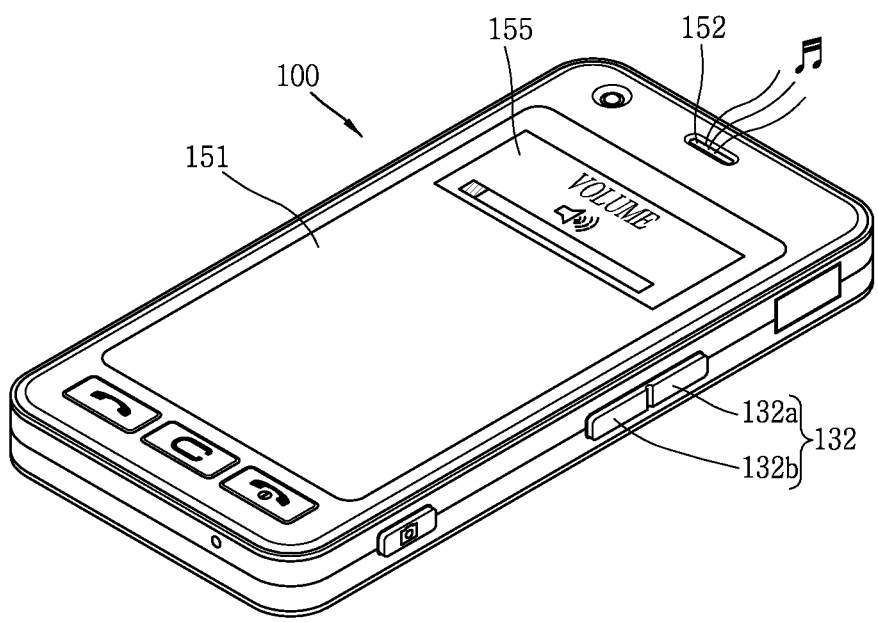

FIGS. 13A and 13B are conceptual views showing a second operation example of the mobile terminal of FIG. 10.

The mobile terminal 100 includes the sound output module 152, the user input unit 132 and the controller 180. The user input unit 132 may include a side up key 132a and a side down key 132b.

Referring to FIG. 13A, the sound output module 152 may output a sound. If a control command applied to the user input unit 132 is sensed, i.e., a control command applied to the side down key 132b so as to decrease a volume level of an output sound is sensed, the controller 180 may sense an input pattern applied to the side down key 132b. Accordingly, an input applied to the side down key 132b for a long time may be sensed.

The controller 180 may decrease a volume level of a sound based on a control command. And, the controller 180 may determine whether the controlled volume level corresponds to a preset volume level, e.g., the minimum volume level.

Referring to FIG. 13B, if the controlled volume level corresponds to the minimum volume level, the controller 180 may output a sound at the minimum volume level. That is, unlike in FIGS. 6B and 6C, the controller 180 neither outputs a vibration signal, nor provides a bounce effect to an output sound.

If the controlled volume level corresponds to a mute level, the controller 180 may control an output sound to be mute, and may ignore a control command applied to the side down key 132b as shown in FIG. 6D.

Figure 14:
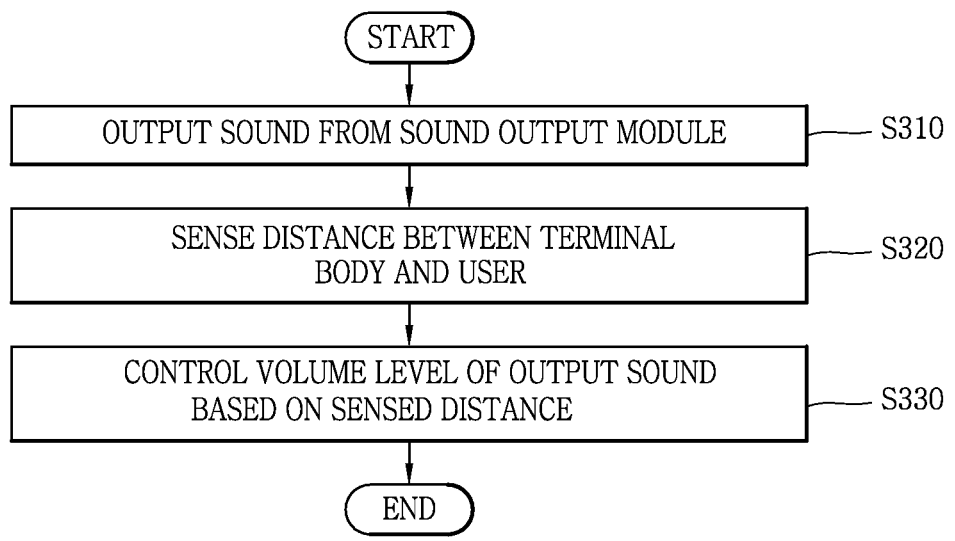
FIG. 14 is a flowchart showing still another embodiment of a mobile terminal according to the present invention.

FIG. 14 is a flowchart showing still another embodiment of the mobile terminal 100 (refer to FIG. 1) according to the present invention.

The mobile terminal 100 includes the terminal body, the sensing unit 140 (refer to FIG. 1), the sound output module 152 (refer to FIG. 1) and the controller 180 (refer to FIG. 1).

Referring to FIG. 14, a sound is output from the sound output module 152 (S310).

Then, a distance between the terminal body and a user is sensed (S320).

More specifically, the sensing unit 140 may be configured to sense a distance between the terminal body and a user using at least one of a proximity sensor, an infrared ray sensor, an ultrasonic wave sensor and a heat sensor. Alternatively, the sensing unit 140 may be configured to sense a distance between the terminal body and a user, based on the user's contact area with the display unit 151 (refer to FIG. 1).

Then, a volume level of an output sound is controlled based on the sensed distance (S330).

Specifically, the controller 180 may control a volume level of an output sound in an absolute manner or in a relative manner.

More specifically, the controller 180 may output a sound at a preset volume level according to the distance. If the distance is more than a reference distance, the controller 180 may output a sound at a volume level higher than the current volume level. On the other hand, if the distance is less than the reference distance, the controller 180 may output a sound at a volume level lower than the current volume level. Such method for controlling a volume level may be performed according to a user's selection, or according to an inner setting of the mobile terminal 100.

Figure 15A:
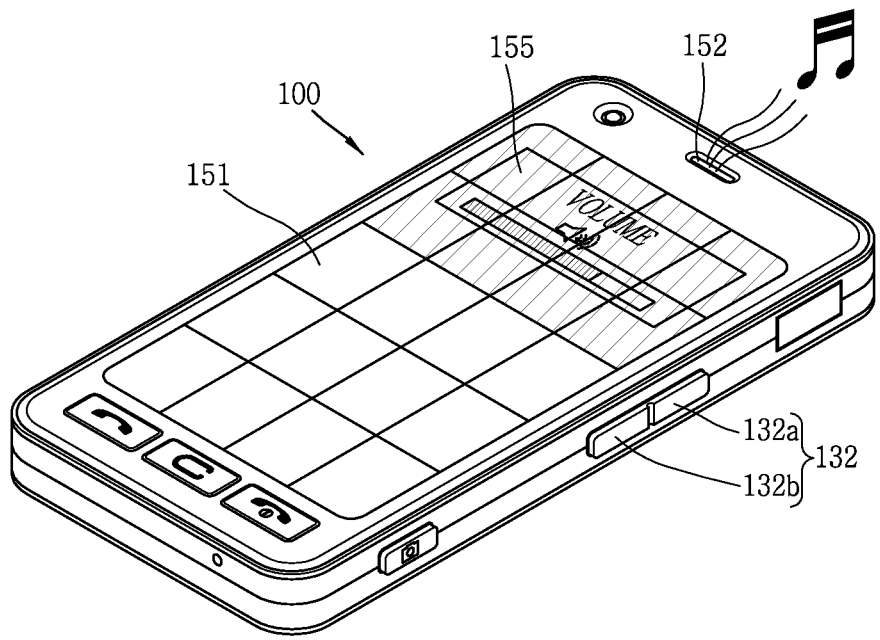
FIGS. 15A and 15B are conceptual views showing operation examples of a mobile terminal of FIG. 14.
Figure 15B:
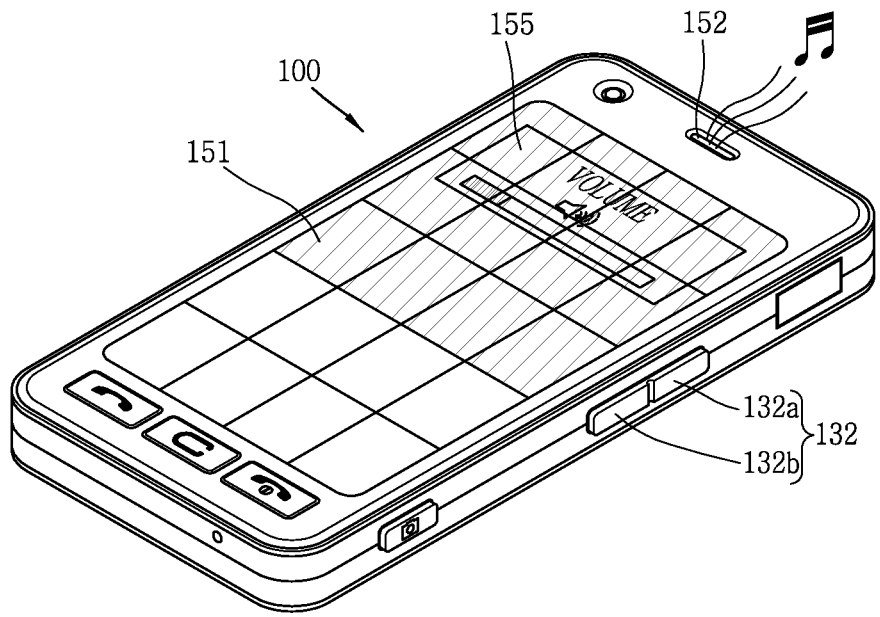

FIGS. 15A and 15B are conceptual views showing operation examples of the mobile terminal of FIG. 14.

The mobile terminal 100 includes the terminal body, the sensing unit 140 (refer to FIG. 1), the sound output module 152 (refer to FIG. 1), the controller 180 (refer to FIG. 1) and the display unit 151.

Referring to FIGS. 15A and 15B, the sound output module 152 may output a sound at a first volume level. If a user's contact area with the display unit 151 increases, the controller 180 may control a volume level of an output sound as a second volume level.

Specifically, if a user's specific body (e.g., a user's face) has an increased contact area with the display unit 151 during a call, the controller 180 may calculate the increased contact area. Then, the controller 180 may control a volume level of an output sound as a second volume level based on the calculated increased contact area. This can allow a sound to be output at a lower volume level.

The aforementioned method may be implemented as a program code stored in a computer-readable storage medium. The storage medium may include ROM, RAM, CD-ROM, a magnetic tape, a floppy disc, an optical data storage device, etc. And, the storage medium may be implemented as carrier wave (transmission through the Internet).

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a sound output module configured to output a sound;
a user input unit configured to sense a control command for controlling a volume level of the sound; and
a controller configured to:
sense an input pattern applied to the user input unit based on a duration for which an input for the control command is applied to the user input unit so as to control the volume level;
determine whether the volume level of the sound corresponds to a maximum volume level or a minimum volume level;
if the determined volume level corresponds to the maximum volume level, provide a first bounce effect of the sound for a first preset time period between the maximum volume level and a lower volume level corresponding to one predetermined sound level lower than the maximum volume level such that the volume level of the sound changes repeatedly between the maximum volume level and the lower volume level during the first preset time period; and if the determined volume level corresponds to the minimum volume level, provide a second bounce effect of the sound for a second preset time period such that the volume level of the sound changes repeatedly between the minimum volume level and a mute level during the second preset time period.

2. The mobile terminal of claim 1,
wherein the user input unit includes at least one of a side up key for increasing the volume level or a side down key for decreasing the volume level,
wherein if the volume level corresponds to the maximum volume level, the controller locks the side up key, and
wherein if the volume level corresponds to the mute level, the controller locks the side down key.

3. The mobile terminal of claim 1, further comprising:
a terminal body; and
a sensing unit configured to sense a distance between the terminal body and a user,
wherein the controller is further configured to control the volume level of the sound based on the sensed distance.

4. The mobile terminal of claim 3, further comprising a display unit, wherein the sensing unit is further configured to:
sense the distance between the terminal body and the user using at least a proximity sensor, an infrared ray sensor, an ultrasonic sensor or a heat sensor; or
sense the distance between the terminal body and the user based on a user's contact area with the display unit.

5. A method for controlling a mobile terminal, the method comprising:
outputting a sound from a sound output module of the mobile terminal;
sensing a control command for controlling a volume level of the sound in response to an input received via a user input unit of the mobile terminal;
sensing an input pattern applied to the user input unit based on a duration for which an input for the control command is applied to the user input unit so as to control the volume level;
determining whether the volume level corresponds to a maximum volume level or a minimum volume level;
if the determined volume level corresponds to the maximum volume level, providing a first bounce effect of the sound for a first preset time period between the maximum volume level and a lower volume level corresponding to one predetermined sound level lower than the maximum volume level such that the volume level of the sound changes repeatedly between the maximum volume level and the lower volume level during the first preset time period; and
if the determined volume level corresponds to the minimum volume level, providing a second bounce effect of the sound for a second preset time such that the volume level of the sound changes repeatedly between the minimum volume level and a mute level during the second preset time period.

* * * * *